(12) United States Patent  (10) Patent No.: US 6,186,095 B1
Simon                      (45) Date of Patent:   Feb. 13, 2001

(54) TOY BALL FOR ANIMALS

(75) Inventor: Allen Simon, E. Northport, NY (US)

(73) Assignee: Four Paws Products, Ltd., Hauppauge, NY (US)

( * ) Notice: Under 35 U.S.C. 154(b), the term of this patent shall be extended for 0 days.

(21) Appl. No.: 09/444,132

(22) Filed: Nov. 19, 1999

(51) Int. Cl.[7] .................................................. A01K 29/00
(52) U.S. Cl. ............................................................. 119/707
(58) Field of Search .................................. 119/702, 707, 119/709, 710, 711; 273/58 B, 58 R, 58 F

(56) References Cited

U.S. PATENT DOCUMENTS

| 1,534,964 | * | 4/1925 | Kahnweiler . | |
| 2,086,631 | * | 7/1937 | Munro | 119/709 |
| 3,498,613 | | 3/1970 | Dreyer | 273/95 |
| 3,648,403 | * | 3/1972 | Gommel | 46/1 R |
| 3,995,855 | | 12/1976 | Schultz | 273/58 F |
| 4,088,319 | | 5/1978 | Clarke | 273/58 R |
| 4,133,296 | * | 1/1979 | Smith | 119/707 |
| 4,727,825 | * | 3/1988 | Houghton | 119/702 |
| 4,756,530 | | 7/1988 | Karman | 273/113 |
| 5,009,193 | * | 4/1991 | Gorddon | 119/702 |
| 5,161,798 | | 11/1992 | Orbanes et al. | 273/58 E |
| 5,191,856 | * | 3/1993 | Gordon | 119/702 |
| 5,343,828 | * | 9/1994 | Houghton et al. | 119/702 |
| 5,351,650 | * | 10/1994 | Graves | 119/707 |
| 5,390,629 | * | 2/1995 | Simone | 119/711 |
| 5,758,604 | * | 6/1998 | Jorgensen | 119/711 |
| 5,813,366 | * | 9/1998 | Mauldin, Jr. | 119/710 |
| 5,819,690 | * | 10/1998 | Brown | 119/707 |
| 5,857,431 | * | 1/1999 | Peterson | 119/710 |
| 5,870,971 | * | 2/1999 | Krietzman et al. | 119/707 |
| 5,924,908 | * | 7/1999 | O'Heir | 446/168 |
| 5,965,182 | * | 10/1999 | Lindgren | 119/707 |

* cited by examiner

Primary Examiner—Thomas Price
(74) Attorney, Agent, or Firm—Darby & Darby

(57) ABSTRACT

An animal ball toy having an outer ball with a hollow chamber and at least one aperture defined therethrough. Disposed inside of the hollow chamber is an object, such as an inner ball. The object is made from a compressible material and/or the outer ball is made from a resilient material. During manufacture the object is compressed and/or the aperture in the outer ball is enlarged so as to pass the object through the aperture and into the hollow chamber of the outer ball. After being passed through the aperture, the object and/or the aperture are released to return to their original size and shape thereby prohibiting the object from exiting through the aperture.

31 Claims, 1 Drawing Sheet

TOY BALL FOR ANIMALS

BACKGROUND OF THE INVENTION

1. Field of the Invention

The present invention relates to a toy for animals, and in particular to an animal ball toy.

2. Description of Related Art

A wide variety of toys are available for entertaining and playing with animals.

U.S. Pat. No. 1,534,964 discloses a ball toy for animals including a hollow flexible rubber ball and a cloth mouse disposed therein. The ball is divided into two hemispherical portions with a plurality of slots defined through one of the hemispherical sections. One of the slots is enlarged so that the artificial mouse may be inserted therethrough. When released the slot returns to its original size and shape so as not to allow the mouse to exit from the ball through the slot in which it was inserted, however, a portion of the mouse may protrude through the aperture to entice the animal. Animals playing with the ball toy derive entertainment from the motion of the ball as it bounces or rolls across a surface, such as the floor. Because the artificial mouse is made of a cloth material and has a non-circular shape as the ball rolls across the floor, the movement of the mouse therein imposes a drag that limits or restricts the momentum of the ball. As a result the toy is not very challenging for an animal to capture and thus, not very entertaining. Another disadvantage is that this toy is clearly marketed for a cat, as indicated by the fact that a mouse is disposed inside the ball which may be filled with catnip to further entice the cat. Therefore, the toy holds significantly less interest, if any, for a dog.

Another animal ball toy is disclosed in U.S. Pat. No. 3,995,855. The ball toy includes a high bounce or very resilient inner rubber ball enclosed in a light weight outer ball so that the inner ball is completely concealed from view by the animal. During manufacture the outer ball is vulcanized around the inner ball. The overall cost of such a toy must be maintained relatively inexpensive. Manufacture of the toy is relatively costly since the outer ball must be vulcanized around the inner ball. The sole purpose of the inner ball is to produce unpredictable and erratic behavior when the toy bounces off of a surface. Furthermore, because the inner ball is not observable, its movement within the outer ball fails to provide any visual stimulus to entice or entertain the animal.

It is therefore desirable to develop a ball toy of interest to a wide range of animals that may be manufactured at a relatively inexpensive cost and overcomes the above mentioned problems.

SUMMARY OF THE INVENTION

The present invention is directed to a ball toy for animals. In accordance with the invention, the ball toy includes an inner ball surrounded by a larger outer ball. The inner ball may be hollow or solid. If the inner ball is hollow, it may hold an object therein, such as a bell. The outer ball is hollow so that the inner ball may move freely therein and has one or more apertures, of any desired shape or design, defined therethrough.

The invention is directed to an animal toy including an inner ball and an outer ball larger in size relative to the inner ball. The outer ball is formed from a resilient material. In addition, the outer ball delimits a hollow chamber and has at least one aperture defined therethrough. The aperture is capable of being enlarged to pass the inner ball into the hollow chamber.

In another embodiment, the invention relates to an animal toy including an object and an outer ball larger in size relative to the object. The outer ball delimits a hollow chamber and has at least one aperture defined therethrough. The object is capable of being compressed to pass through the aperture into the hollow chamber.

The invention also relates to a method for manufacturing an animal toy described above. In accordance with the method, an object smaller in size than an outer ball is compressed to a size sufficient to pass the object through the aperture and into the hollow chamber. The compressed object is then passed through the aperture and into the hollow chamber. Once the object is in the hollow chamber, the compressed object is released so that it returns to its original size and shape, thereby prohibiting the object from exiting the hollow chamber through the aperture.

In another embodiment of the invention, the aperture is enlarged to pass an inner ball therethrough. After the inner ball passes into the hollow chamber the aperture is released and returns to its original size and shape, thereby prohibiting the inner ball from exiting the hollow chamber through the aperture.

Yet another embodiment of the invention is directed to a method for manufacturing an animal ball toy in which both the aperture is enlarged and the object is compressed to pass the object through the aperture and into the hollow chamber. Once the compressed object and enlarged aperture are released they return to their original size and shape prohibiting the object from exiting the hollow chamber through the aperture.

BRIEF DESCRIPTION OF THE DRAWINGS

The foregoing and other features of the present invention will be more readily apparent from the following detailed description and the accompanying drawings, in which:

FIG. 1b is an enlarged portion of the inner ball with recesses defined in its exterior surface, as shown in FIG. 1a.

DETAILED DESCRIPTION OF THE PREFERRED EMBODIMENT

Figure 1A:
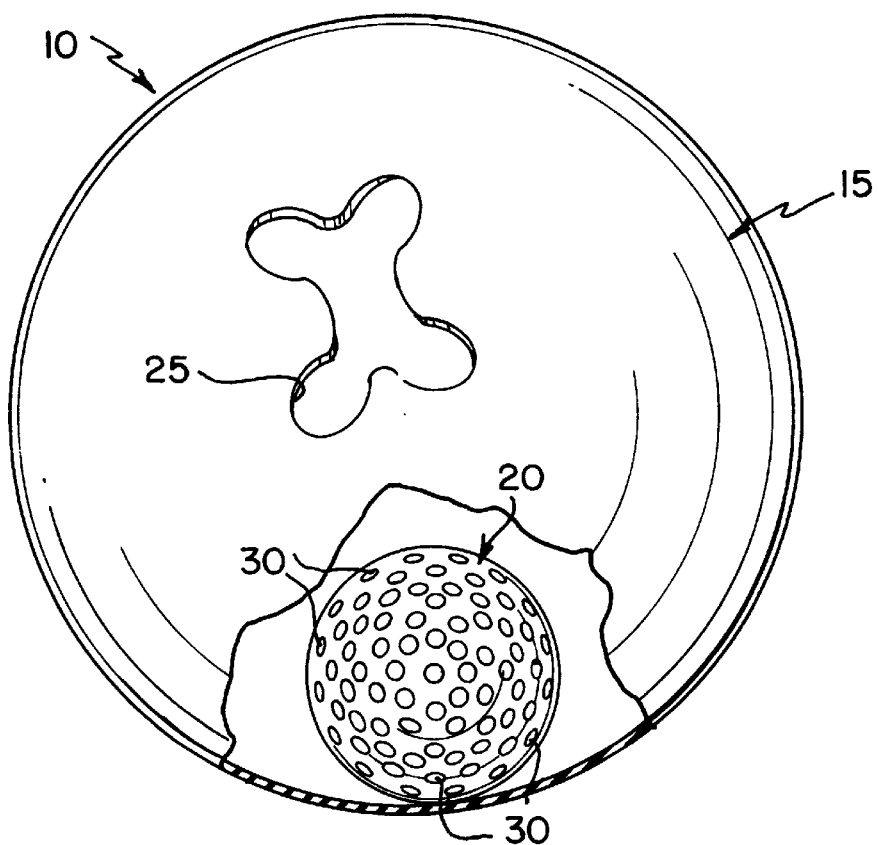
FIG. 1a is a perspective view of the ball toy for animals in accordance with the present invention, wherein the inner ball has a plurality of recesses defined in its exterior surface.
Figure 1B:
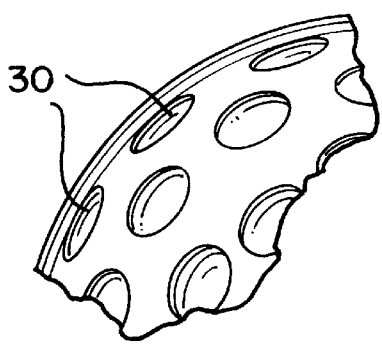
Figure 1C:
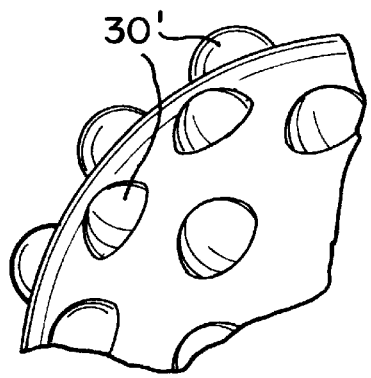
FIG. 1c in an enlarged portion of an alternative embodiment of an inner ball having protuberances projecting from its exterior surface.

A ball toy 10 for animals in accordance with the present invention is shown in FIG. 1a. The toy 10 includes a hollow outer ball 15 and one or more smaller inner balls 20 disposed therein. One or more apertures or openings 25 are defined through the outer ball to provide access to its hollow chamber. By way of example, aperture 25 shown in FIG. 1a is in the shape of a bone, however, the aperture may be any desired shape. All of the apertures may have a common size and shape. Alternatively, the apertures may be different sizes and/or different shapes. Inner ball 15 may be solid or hollow and may have an object, such as a bell, disposed therein. As shown in FIG. 1b, the exterior surface of the outer ball 15 may have recesses or dimples 30 defined therein. Alternatively, or in addition to the recesses, protuberances 30' may extend radially outward from the exterior surface, as shown in FIG. 1c. The recesses and protuberances invoke erratic, less predictable movement of the toy so that it holds the interest of the animal for a longer period of time.

In a first embodiment, the outer ball 15 is made from a resilient material, such as rubber, while the inner ball 20 is made from a relatively non-compressible material. The size of the aperture 25 and inner ball 20 are selected so that when the aperture is stretched open the inner ball may be readily passed therethrough without being compressed, yet small enough so that substantially the entire inner ball is prevented from exiting the outer ball when the aperture is released and returns to its original size and shape. During manufacture, the outer ball 15 having at least one aperture 25 defined therethrough is formed in a mold or cast. Once the outer ball is formed, the aperture is stretched to accommodate the inner ball which is passed therethrough. The aperture is then released so that it returns to its original size and shape, thereby preventing substantially the entire inner ball 20 from exiting the outer ball 15 through the aperture 25.

In a second embodiment, outer ball 15 may be formed from a resilient material, preferably rubber. On the other hand, the inner ball 20 is made from a compressible material, such as vinyl. During manufacture, the outer ball 15 having at least one aperture 25 defined therethrough is formed in a mold or cast. Once the outer ball 15 is formed, the aperture 25 is stretched or enlarged and the inner ball 20 is compressed in size so as to pass therethrough. In this embodiment, inner ball 20 need not be compressed down to as small a size as in the first embodiment since the outer ball 15 is resilient and thus, the aperture 25 may be enlarged. As the inner ball passes through the aperture 25 it returns to its original size and shape.

A third embodiment of the animal ball toy in accordance with the present invention is similar to that of the second embodiment, except that the outer ball 15 is made from a non-resilient material, such as vinyl. In this alternative embodiment, the inner ball 20 is compressed to a sufficiently small size to pass through the aperture 25 while in a relaxed state, that is, without the aperture being stretched or enlarged.

Although the present invention shows and describes an inner spherical ball disposed within the outer ball, any shaped object may be inserted into the hollow chamber of the outer ball, as desired. The inner ball is advantageous in that it provides the most momentum to the toy. Other non-spherical shaped objects, however, may be substituted for the inner ball to appeal to a particular animal, while sacrificing the overall movement of the toy.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. An animal toy comprising:
   an inner ball; and
   an outer ball larger in size relative to said inner ball and formed from a resilient material, said outer ball having a hollow chamber and at least one aperture defined therethrough, the aperture being enlargeable to pass said inner ball into the hollow chamber.

2. An animal toy in accordance with claim 1, wherein the aperture is sized so that while in a relaxed state no portion of said inner ball projects through the aperture.

3. An animal toy in accordance with claim 1, wherein said outer ball is formed from rubber.

4. An animal toy in accordance with claim 3, wherein said inner ball is made of rubber.

5. An animal toy in accordance with claim 1, wherein said inner ball is solid.

6. An animal toy in accordance with claim 1, wherein said inner ball is hollow.

7. An animal toy in accordance with claim 6, further comprising an object disposed within said inner ball.

8. An animal toy in accordance with claim 1, wherein said inner ball has an exterior surface.

9. An animal toy in accordance with claim 8, wherein the exterior surface of said inner ball has a plurality of concave recesses defined therein.

10. An animal toy in accordance with claim 8, further comprising a plurality of protuberances projecting radially outward from the exterior surface of said inner ball.

11. An animal toy in accordance with claim 9, further comprising a plurality of protuberances projecting radially outward from the exterior surface of said inner ball.

12. The animal toy in accordance with claim 1, wherein the aperture, while in a relaxed state, is smaller in size than said inner ball.

13. An animal toy comprising:
    an object; and
    an outer ball larger in size relative to said object, said outer ball having a hollow chamber and at least one aperture defined therethrough, said object being compressible to pass through the aperture into the hollow chamber.

14. An animal toy in accordance with claim 13, wherein said object is a ball.

15. An animal toy in accordance with claim 13, wherein said object is non-spherical.

16. An animal toy in accordance with claim 13, wherein said outer ball is formed from a resilient material.

17. An animal toy in accordance with claim 16, wherein said outer ball is formed of rubber.

18. An animal toy in accordance with claim 16, the aperture of said outer ball being enlargeable to pass said object into the hollow chamber.

19. An animal toy in accordance with claim 13, said outer ball is formed from a substantially non-resilient material.

20. An animal toy in accordance with claim 13, said object being of sufficient size so as not to protrude through the aperture while in a relaxed state.

21. The animal toy in accordance with claim 13, wherein the aperture, while in a relaxed state, is smaller in size than said object.

22. A method for manufacturing an animal ball toy including an outer ball, having a hollow chamber and at least one aperture defined therethrough, said method comprising the steps of:
    compressing an object smaller in size than said outer ball to a size sufficient to pass said object through the aperture and into the hollow chamber;
    passing said compressed object through the aperture and into the hollow chamber of said outer ball; and
    releasing said compressed object so that it returns to its original size and shape prohibiting said object from exiting the hollow chamber through the aperture.

23. The method in accordance with claim 22, wherein said object is an inner ball.

24. The method in accordance with claim 22, wherein said object is non-spherical.

25. The method in accordance with claim 22, wherein the aperture, while in a relaxed state, is smaller in size than said object.

26. A method for manufacturing an animal ball toy including an outer ball made from a resilient material, having a hollow chamber and an aperture defined therethrough, said method comprising the steps of:

enlarging a size of the aperture;

passing an object through the enlarged aperture and into the hollow chamber of said outer ball; and releasing said enlarged aperture so that it returns to an original size and shape prohibiting said object from exiting the hollow chamber through the aperture.

27. A method for manufacturing an animal ball toy including an outer ball made from a resilient material, having a hollow chamber and an aperture defined therethrough, said method comprising the steps of:

enlarging a size of the aperture;

compressing an object smaller in size than said outer ball to a size sufficient to pass said object through the enlarged aperture and into the hollow chamber;

passing said compressed object through the enlarged aperture and into the hollow chamber of said outer ball; and releasing said compressed object and enlarged aperture so that they return to their original size and shape prohibiting said object from exiting the hollow chamber through the aperture.

28. The method in accordance with claim 27, wherein said object is an inner ball.

29. The method in accordance with claim 27, wherein said object is non-spherical.

30. The method in accordance with claim 26, wherein the aperture, while in a relaxed state, is smaller in size than said inner ball.

31. The method in accordance with claim 27, wherein the aperture, while in a relaxed state, is smaller in size than said object.

* * * * *